United States Patent [19]

Kaiser et al.

[11] Patent Number: 4,900,208
[45] Date of Patent: Feb. 13, 1990

[54] ROOFING FASTENER

[76] Inventors: Norbert O. Kaiser, 1627 S. Ridge Dr., Arlington Heights, Ill. 60005; Eric W. Balinski, 62 Hemlock Hill, Dalton, Mass. 01226

[21] Appl. No.: 204,360

[22] Filed: Jun. 9, 1988

[51] Int. Cl.[4] .............................................. F16B 25/00
[52] U.S. Cl. ..................................... 411/387; 411/188; 411/310; 411/410; 411/418; 411/901; 411/908; 411/914; 52/410
[58] Field of Search ................................ 411/185–189, 411/309–311, 386, 387, 410, 417, 418, 908, 401–403, 900, 901, 907, 914; 52/410, 509, 512

[56] References Cited

U.S. PATENT DOCUMENTS

| | | | |
|---|---|---|---|
| 1,088,892 | 3/1914 | Foreman | 411/418 |
| 1,465,148 | 8/1923 | Rosenberg | 411/418 |
| 1,933,332 | 10/1933 | May | 411/418 |
| 2,037,586 | 4/1936 | Olson | 411/188 |
| 2,122,915 | 7/1938 | Olson | 411/386 |
| 2,173,707 | 9/1939 | Brown | 411/403 |
| 2,993,950 | 7/1961 | Forman | 411/387 X |
| 3,803,085 | 4/1974 | Takehoshi | 528/38 X |
| 4,003,175 | 1/1977 | Patry | 411/387 X |
| 4,354,725 | 10/1982 | Herbaugh et al. | 411/908 X |
| 4,361,997 | 12/1982 | DeCaro | 52/410 X |
| 4,453,361 | 6/1984 | Hulsey | 52/410 |
| 4,568,229 | 2/1986 | Hulsey | 411/387 |
| 4,718,801 | 1/1988 | Berecz | 411/908 X |

FOREIGN PATENT DOCUMENTS

| | | | |
|---|---|---|---|
| 2756494 | 6/1979 | Fed. Rep. of Germany | 411/907 |
| 2361568 | 3/1978 | France | 411/403 |
| 8105373 | 6/1983 | Netherlands | 52/410 |
| 645437 | 9/1984 | Switzerland | 52/410 |
| 2098693 | 11/1982 | United Kingdom | 411/410 |

*Primary Examiner*—Gary L. Smith
*Assistant Examiner*—Douglas E. Ringel
*Attorney, Agent, or Firm*—Garrettson Ellis

[57] ABSTRACT

A fastener for insulated roofing comprises a non-metallic, screw-threaded shank, having a penetrating point at one end of the shank and a transverse plate carried at the other end of the shank. The shank and transverse plate are preferably integrally method out of a polyetherimide resin formulation which has a tensile strength of at least 15,000 psi. as tested by ASTM D638. Such a fastener has a great advantage in terms of cost and lack of corrodability, while still exhibiting the required strength. Also, a universal driver socket is provided.

15 Claims, 2 Drawing Sheets

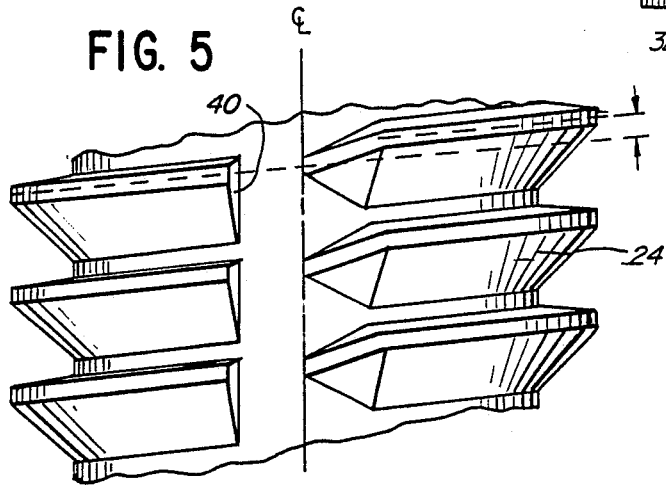
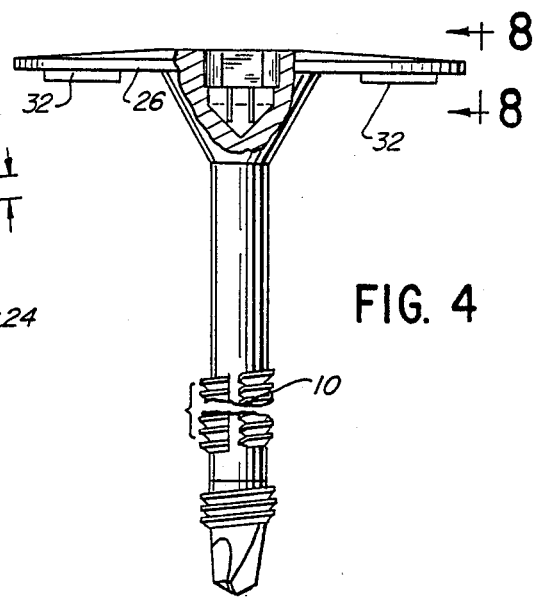
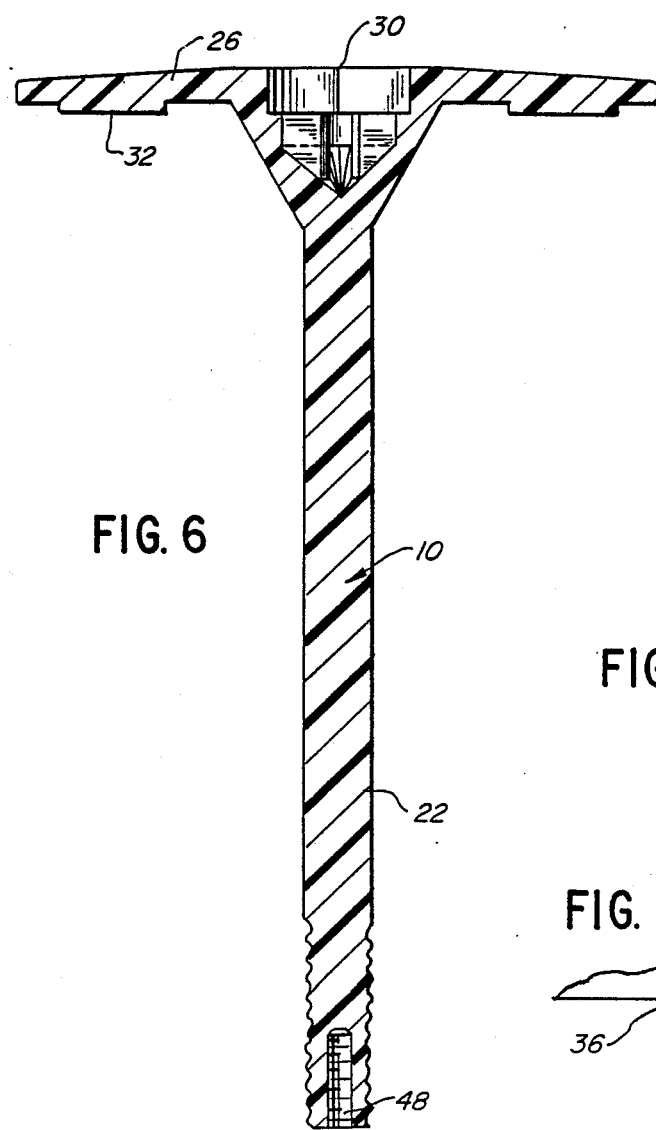
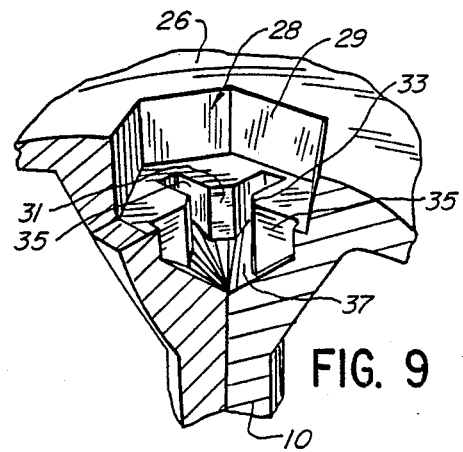
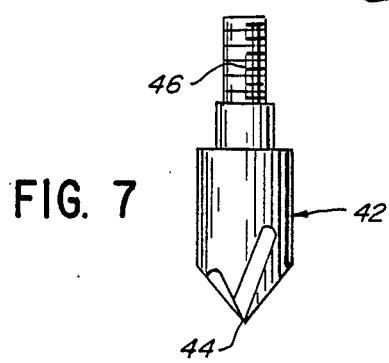
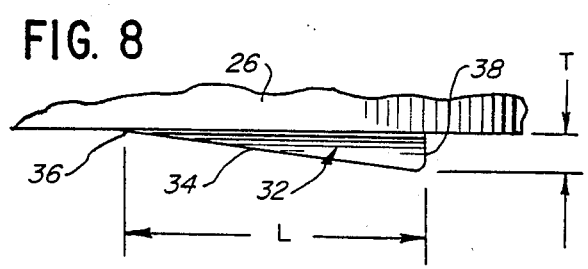

ROOFING FASTENER

BACKGROUND OF THE INVENTION

The invention of this application relates to an improved fastener for roofing, particularly flat roofing of the single ply type or built-up roof type. In that context, roofing fasteners are used to fasten the insulation layer of the roofing to a perforated metal or wood deck, or the like. The use of mechanical fasteners can reduce the amount of shifting of the insulation which, in turn, avoids holes, splits, and cracks in a plastic roof membrane which overlies the insulation to prevent leakage. Thus the membrane integrity is better preserved, and the roof does not leak.

Additionally, a roof may be laid right over an old roof. In this circumstance, roofing fasteners may penetrate through the old roof into the deck. While metal decks are most typical, concrete decks are also used, or pre-formed wood fiber decks, gypsum decks, or the like. The roofing fasteners are screwed into whatever deck is present for retention of the upper layers.

The roofing fasteners of the prior art are typically made of steel. However, it is common for a significant amount of moisture to be present within the roof, underneath whatever protective moisture barrier coating is used. Particularly, when a new roof is put over an old roof, the old roofing materials may contain a significant amount of moisture, with the result that steel fasteners can face significant rusting conditions. Eventually, the fasteners may rust through and break, which can ultimately result in a failure of the roof system and possible blow-off.

In Patry, U.S. Pat. No. 4,003,175, a roofing fastener having a nonmetallic outer core is disclosed. This outer core may be made of plastic, for example polyvinylchloride, nylon, epoxy, polyurethane, or the like. However, because such plastics have generally exhibited insufficient strength to encounter stresses placed upon the roofing fastener during installation and afterwards, an inner metal core is provided. Such a structure is clearly rather expensive to manufacture, and is not immune from the effects of corrosion. For example, water can seep into the junction between the outer plastic portion and the core over the years, with ultimate rusting away of the core, resulting in a great decrease in fastener strength.

Forman, U.S. Pat. No. 2,993,950 shows another type of fastener having a metallic core element and a plastic outer body or casing.

In accordance with this present invention, a substantially nonmetallic fastener is provided, which may have an optional metal tip, but which is substantially nonmetallic along the majority of its length. Thus, a nonmetallic fastener is provided which has adequate strength for use as a roofing fastener. Because the fastener is predominately nonmetallic, it is substantially immune to corrosion so that it does not lose its effectiveness over the years. Additionally, the preferred plastic itself of the fastener retains its strength in the presence of water to a degree better than other plastics such as nylon, for example, resulting in a high strength, long lasting, corrosion free roofing fastener, for providing roofs having extended useful lives.

Also, by the invention of this application a universal driver socket is provided to the fastener, to permit the fastener to be rotatably driven into a roof with a screwdriver or other driver of the Phillips, Allen, or conventional types.

SUMMARY OF THE INVENTION

In this invention, a fastener is provided for insulated roofing which comprises a nonmetallic, screw threaded shank, having a penetrating point at one end of the shank, and a transverse plate carried at the other end of the shank. In accordance with this invention, the shank and transverse plate are integrally molded out of a polyetherimide resin formation which has a tensile strength of at least 15,000 psi as tested by ASTM D638.

For example, such polyetherimide resin formulations are available from the General Electric Company, being sold under the trademark ULTEM, either in unreinforced grades of tensile strength on the order of 15,000 psi, or in the preferred grades which are reinforced with glass fibers, having higher tensile strengths, preferably at least about 20,000 psi.

It is also preferred for the above-described transverse plate to define downwardly extending angled projections. The function of these projections is to inhibit reverse rotation of the fastener after the screw advancement of the projections into engagement into an insulated roof. Because of the projections, the transverse plate can enter into engagement with the roof by rotation in the direction in which the angled surface faces. However, the angled projections define a face of higher angle in the opposite rotational direction, typically a perpendicular face, which inhibits reverse rotation after engagement of the transverse plate with the roofing material.

The penetrating point of the fastener may be defined by a metal insert member carried on the shaft at one end thereof. Alternatively, the pointed end of the polyetherimide plastic shank may be plated with metal to harden the pointed end, so that it can successfully penetrate a deck on which the roof is supported. However, it has been found that the fastener of this invention can be used to penetrate a deck without any metal reinforcement.

The transverse plate may be of noncircular crosssection so as to prevent rolling off of the roof before installation.

Preferably, the resin formulation from the fastener contains from 5 to 50 percent by weight of glass fibers for reinforcement thereof. Additionally, the shank of the fastener of this invention is preferably 3 to 12 inches in length, preferably at least 6 inches so that the fastener is long enough to penetrate layers of old roofing and still be able to engage the deck underneath all layers of roofing.

Additionally, the screw threads from the shank may define irregularities that inhibit its reverse rotation after screw advancement of the shank into an insulated roof.

The fastener may also define a longitudinal bore at the end of the shank opposed from the one end that carries the penetrating point. This may be used to receive a rotational driving shaft to assist in screwing the fastener into place, if desired, or for removal of the fastener even if the transverse plate has been broken away. This longitudinal bore typically extends through no more than about a third of the length of the shank. Also the bore may be proportioned to receive a Phillips screwdriver, an Allen wrench, and/or a conventional screwdriver or the like.

DESCRIPTION OF DRAWINGS

In the drawings.

FIG. 4 is an elevational view of the roofing fastener of FIG. 1.

FIG. 5 is a magnified perspective view of a portion of the fastener of FIG. 4.

FIG. 6 is a longitudinal sectional view of a portion of the fastener of FIG. 4.

FIG. 7 is an elevational view of the metal tip portion of the fastener of FIG. 4.

FIG. 8 is a highly enlarged, elevational view of a portion of the fastener of FIG. 4, taken from line 8—8 of FIG. 4.

FIG. 9 is a fragmentary, perspective view, with portions broken away, of the central, top portion of the fastener.

DESCRIPTION OF SPECIFIC EMBODIMENTS

Figure 1:
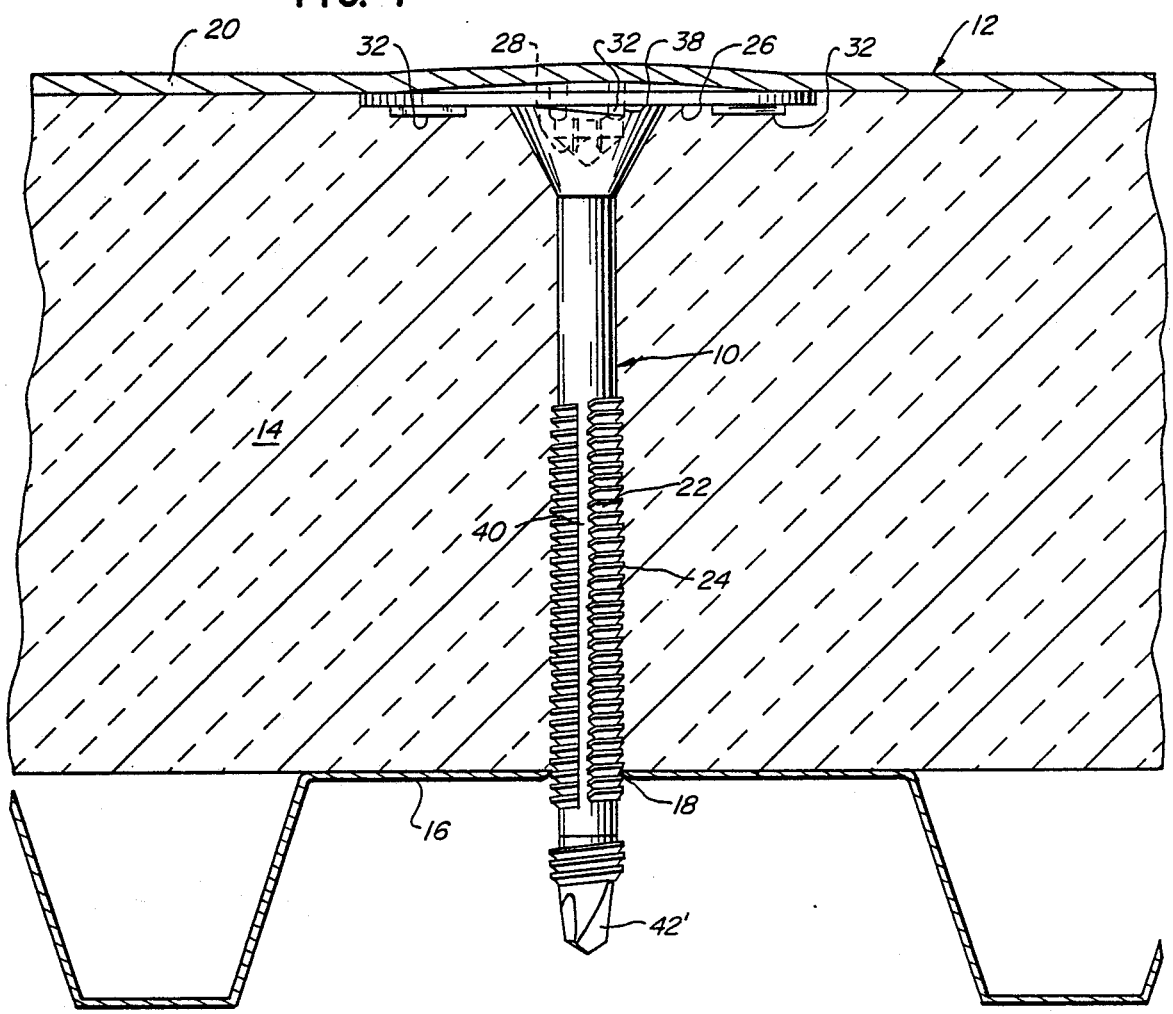
FIG. 1 is an elevational view of a fastener of this invention positioned in a single ply roof, which is shown in transverse section.

Referring to the drawings, FIG. 1 shows fastener 10, installed in insulated roofing 12, for the purpose of retaining conventional insulation 14 in position on deck 16, which is specifically shown to be made of perforated, corrugated metal. Fastener 10 extends through an aperture 18 in the metal sheeting of deck 16 for retention of insulation 14. In this particular design of roof system, a continuous sheet of plastic 20 is laid over fastener 10 and insulation 14, as a simple and effective way to prevent water from entering insulation 14 and seeping through the roof.

In accordance with this invention, fastener 10 may be primarily made of an integrally molded shank 22 which carries screw threads 24 at one end thereof as shown. The nonmetallic shank 22 may preferably be integrally molded out of a poly-etherimide resin which has a tensile strength of at least 15,000 psi as tested by ASTM D638. Such resins are commercially available from the General Electric Company under the trademark ULTEM, being available in both pure, unreinforced form and in various concentrations of glass reinforcement for improved strength. It is generally preferred for the tensile strength of the resin used to be above 20,000 psi, which is currently provided, for example, by General Electric Ultem resin grades 2200, 2300, and 2400, all of them containing fibrous glass reinforcement. Fasteners made of such materials exhibit extremely high strength for plastic, and are highly resistant against weakening of their physical properties over the years in the presence of moisture, so that the roof remains strong and firmly constructed despite the severe conditions of high and low temperatures, strong sunlight, and constant moisture.

Figure 2:
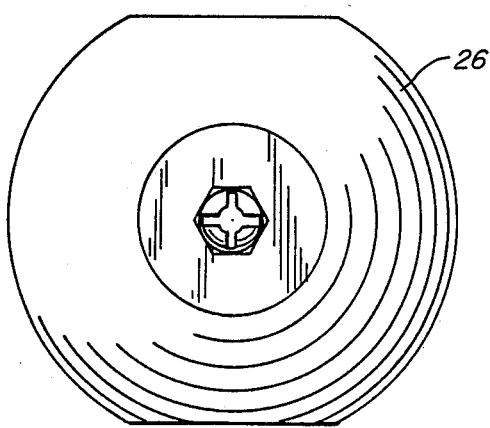
FIG. 2 is an end view of the fastener of FIG. 1, showing the transverse plate of the fastener.
Figure 3:
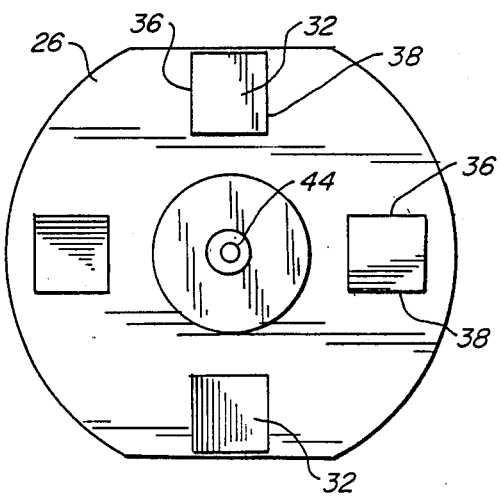
FIG. 3 is a bottom plan view of the roofing fastener taken from the other side of the fastener from the view of FIG. 2.

Fastener 10 carries at one end, typically as an integral part of plastic shank 22, a transverse plate 26 which is typically pressed slightly into the insulation 14 so that fastener 10 does not project outwardly from the insulation to provide a site where roof membrane 20 can be ripped. It can also be seen in FIGS. 2 and 3, for example, that fastener plate 26 is of noncircular cross-section.

Additionally, at the end of the fastener which carries transverse plate 26, there is an aperture 28, open to the exterior and defined through the bore of shank 22. Aperture 28 may be of noncircular cross-section, being of hexagonal cross-section at top section 29, for example for receiving an Allen wrench. Aperture 28 (FIG. 9) is also adapted to receive a Phillips-type screwdriver by the shape intermediate section 31, engaging the disclosed array of radially inwardly projecting members 33, separated by diametrically opposed slots 35, and also conical bottom section 37. Section 37 may also have ribs, if desired, to further engage a Phillips screwdriver. As a third alternative, a conventional screwdriver may be used to engage aperture 28 by entering one of the sets of opposed slots 35.

Thus, aperture 28 may function as a universal driving connection aperture, to permit rotating of fastener 10 with an Allen wrench, or a Phillips-type or conventional screwdriver or the like. Fastener 10 may thus be driven into a roof or unscrewed out of a roof even if transverse plate 26 has been broken off.

On the underside of transverse plate 26 there is positioned a plurality of angled projections 32, see particularly FIG. 8. The angled projections 32 each define a tapered outer surface 34 which extends to a feather edge 36, integral with the rest of plate 26 at one end, and a step-edge 38 defined at its other end. The feather edges 36 of angled projections 32 are all positioned on the same rotational side of each angled projection, so that as fastener 10 is rotated in advancing screw threaded manner, projections 32 may advance into engaging relation with the insulation material 14 as shown in FIG. 1. However, if after such engagement one attempts to rotate fastener 10 in the opposite direction to withdraw it, the stepped ends 38 of angled projections 32 tend to dig into the insulation and resist such counterrotation and withdrawal. Thus, fasteners 10 tend to stay in their advanced, engaged positions rather than to be slowly withdrawn by expansion forces and the like from their advanced, rotational position.

Additionally, screw threads 24 of fastener 10 exhibit step members 40 which are positioned to permit rotation in the desired advancement direction, but to resist counterrotation by the engagement of the step members 40 of screw threads 24 against the insulation 14 present. Thus, while it is possible to withdraw the fasteners again by counterrotation, it is unlikely that they will spontaneously counterrotate by thermal expansion or contraction, or the like, which, of course, would be undesirable for the maintenance of the roof.

Fastener 10 may carry a metal insert member 42 which defines the penetrating point 44 of fastener 10. As shown in FIGS. 6 and 7, metal insert 42 may carry a threaded shank 46 which fits into threaded aperture 48 of plastic shank 22. Alternatively, threaded shank 46 may be ultrasonically welded or glued by adhesive into aperture 48, if desired.

As an alternative, fastener 10 may be molded in the exact and complete structure shown in FIG. 4, including a plastic portion corresponding to member 42. In this instance, it may be desirable to plate metal in conventional manner onto the plastic of such a tip section corresponding to reference numeral 42. For example, one may electroplate first a copper layer, then a nickel layer, then a chromium layer of metal on the tip 42 of such an all-plastic fastener, this being represented by the fastener as shown in FIG. 1.

For example, the metal insert tip 42, or the corresponding metal plating of a plastic integral tip 42', provides good penetration of the tip of fastener 10 through the desired deck 16 which is shown to be made of sheet metal, but may be made of other materials as previously described. Aperture 18 is preferably slightly undersized compared with the diameter of fastener 10, so that the tip drives through the aperture, forming a tight fit therewith for good retention of the fastener within the aperture by its retention with threads 24.

Accordingly, by this invention a roofing fastener is provided which may last for years in moist conditions without corrosion, as is the difficulty with many metal fasteners, with excellent roof retention strength, and with a very low tendency to back off from its rotationally advanced position by thermal expansion or contraction and the like. Thus, roofs may last for years longer than in many present cases without experiencing any difficulty because of failure of the fasteners.

The above has been offered for illustrative purposes only, and is not intended to limit the scope of the invention of this application, which is as defined in the claims below.

That which is claimed is:

1. A fastener for insulated roofing which comprises a nonmetallic, screw-threaded shank, a penetrating point at one end of said shank, and a transverse plate carried at the other end of said shank, said shank and transverse plate being integrally molded out of a polyetherimide resin formulation which has a tensile strength of at least 15,000 psi as tested by ASTM D638, in which the penetrating point of said nonmetallic, screw-threaded shank comprises a core of said resin formulation integral with the remainder of said shank, said core being coated with metal plating.

2. The fastener of claim 1 in which said plastic formulation is glass fiber filled.

3. The fastener of claim 1 which is 3 to 12 inches in length.

4. The fastener of claim 3 in which said resin formulation contains 5 to 50 percent by weight of glass fibers.

5. The fastener of claim 1 in which the screw threads of said shank define step members that inhibit reverse rotation of said shank after screw advancement into an insulated roof.

6. The fastener of claim 1 in which said plate defines on its side facing said shank a plurality of angled projections that inhibit reverse rotation of said fastener after screw advancement of said projections into engagement with an insulated roof.

7. The fastener of claim 1 in which said transverse plate defines a flat, outer surface through which a driving socket opens, said driving socket defining an outer section of polygonal cross-section, and an intermediate section which comprises a plurality of radially inwardly projecting members separated by radial slots, whereby said socket can receive for driving a plurality of different types of driving members.

8. The fastener of claim 7 in which said driving socket also defines a generally conical bottom section.

9. A fastener for insulated roofing which comprises a nonmetallic, screw-threaded shank, a penetrating point at one end of said shank, and a transverse plate carried at the other end of said shank, said shank and transverse plate being integrally molded out of a polyetherimide resin formulation which has a tensile strength of at least 15,000 psi as tested by ASTM D638, the screw threads of said shank having axially displaced portions defining step members that inhibit reverse rotation of said shank after screw advancement into an insulated roof.

10. The fastener of claim 9 in which said resin formulation contains 5-50% by weight of glass fibers.

11. The fastener of claim 9 in which said penetrating point is defined by a metal insert member carried of said shank at said one end.

12. The fastener of claim 9 in which the penetrating point comprises a core of plastic integral with said shank, said core of plastic being coated with metal plating.

13. The fastener of claim 9 which is 3 to 12 inches in length.

14. The fastener of claim 9 in which said transverse plate defines a flat outer surface, a driving socket defined through said transverse plate at the center thereof, said driving socket defining an outer section of polygonal cross-section and an intermediate section which comprises a plurality of radially inwardly projecting members separated by radial slots, whereby socket can receive for driving a plurality of different types of driving members.

15. The fastener of claim 14 in which the driving socket also defines a generally conical bottom section.

* * * * *